(12) United States Patent
Huang

(10) Patent No.: US 6,552,835 B2
(45) Date of Patent: Apr. 22, 2003

(54) REFLECTIVE AND PENETRATIVE SCANNING APPARATUS

(75) Inventor: Chih-Wen Huang, Hsinchu (TW)

(73) Assignee: Umax Data Systems, Inc. (TW)

( * ) Notice: Subject to any disclaimer, the term of this patent is extended or adjusted under 35 U.S.C. 154(b) by 0 days.

(21) Appl. No.: 09/726,881

(22) Filed: Nov. 30, 2000

(65) Prior Publication Data

US 2002/0063938 A1 May 30, 2002

(51) Int. Cl.[7] .............................................. G02B 26/08
(52) U.S. Cl. ........................ 359/196; 359/201; 359/223; 359/204; 358/474; 358/497; 399/200; 399/202; 355/67
(58) Field of Search ................................. 359/196, 223, 359/201; 355/67, 70; 399/200, 201, 202, 211; 358/474, 475, 487, 494, 497

(56) References Cited

U.S. PATENT DOCUMENTS 5,703,674 A * 12/1997 Nishio .......................... 355/70
5,719,540 A * 2/1998 Takaoka et al. ............... 355/67
5,946,532 A * 8/1999 Ichinokawa ................... 355/67

* cited by examiner

Primary Examiner—James Phan

(57) ABSTRACT

A Reflective and Penetrative Scanning Apparatus has a body, a first ambulatory reflection module, a second ambulatory reflection module, a lens assembly, an image shooting unit and an adjustment means. The body incorporates a Reflective Script Platform and a Penetrative Script Platform. The First Ambulatory Reflection Module is equipped with two Light Sources and two lenses with which to produce two different Light Paths such that once the switching goes to the First Light Path, a light that is emitted from the Light Source will travel by way of the Reflective Script Platform to the Lens Assembly and the Image Shooting Unit, to execute Reflective Scanning operation and when the switching goes to the second Light Path, another light that is emitted from the Light Source will travel by way of the Penetrative Script Platform to the Lens Assembly and the Image Shooting Unit, to execute Penetrative Scanning Operation.

12 Claims, 2 Drawing Sheets

REFLECTIVE AND PENETRATIVE SCANNING APPARATUS

BACKGROUND OF THE INVENTION

1. Field of the Invention

The Invention relates to a Reflective and Penetrative Scanning Apparatus, more specifically to a composite design of a Scanning Apparatus whereby both Reflective scanning and Penetrative scanning are accommodated in the same Scanning Assembly.

2. Description of the Related Art

By and large conventional Reflective Optic Image Scanning Apparatus, such as those seen in the markets today, typically achieves the operation of scanning of penetrative scripts, such as, for example, slides, projection films, negative films, and the like, by the provision of a downsweeping module, such as, for example, an overhung lamp, light guide, or backlight board, on the upper lid. However, light emitted from the overhead light source module will be damped by two layers of glass, one layer being integral with the overhung light source module to protect the lamp, and the other layer being embodied with the scanner assembly itself to bear the penetrative script, so that the gravity is redoubled due to factors such as glass cleanliness, levelness, and light transmissivity, on the one hand, and due to Newton Ring effect the quality of the image being scanned will go down, which renders unlikely any attempt to raise the price of the product, let alone any effort to improve the quality of the image feature of so-called high resolution scanner assemblies.

Some composite Reflective/Penetration Dual Platform Scanner Assemblies have been disclosed whereby the Light Source to serve Penetrative Script Scanning purpose goes through but one layer of glass the Light Source to project onto the Penetrative Script with respect to which scanning is to be run, and an operation as such will yield a relatively better scanning quality. Unfortunately, such assemblies suffer from common drawbacks such as those recited below:

(1) At east one rotatable lens is needed to switch Light Paths. If only a lens which is originally intended for application in a reflection of Light Source is used to serve as a rotatable or moving element, then its rotation when used on prolonged basis would indeed result in deviation, which would in turn be reflected in a lowering of scanning quality, and for that reason, this alternative is not feasible for use in high precision scanners.

(2) In certain applications there is a need to employ a "Light Splitter" which in the course of penetrative scripts will, shield, by reflection or refraction, substantial amounts of light beam. Such light splitters degrade the image quality and are therefore also not appropriate for use in high precision scanners.

(3) In certain applications there is a need to employ switchable light shielders so as to proceed with switch-actuated light shielding operation, executed either in a reflective mode or penetrative mode. In such applications it is therefore necessary to provide additionally a series of transmission or drive elements to transmit the light shielders, incurring not only an increase in costs, but also increased failure rates.

While it is also possible to effect composite reflective/penetrative scanning operation by the coordination on the part of a conventional Chassis whereby the lens required for the reflective/penetrative operation on the ambulatory platform must run or turn about an angle or be arranged at different angular settings so as to accommodate differently configured Light Paths, these efforts would necessitate plenty of elements, and components of complicated structure. In addition switching between a reflective mode of operation and a penetrative one is preconditioned by a motor driving to displace the lens to an angle, the lens being a mobile component in this connection. However, since the lens is subjected to forced displacement, this will bring about very appreciable deviation after prolonged use, that will inevitably bring about a lowering in the quality of scanning performance, for that reason such a design is not feasible for use in high precision scanners.

There are other known devices that are multiple-function Image Shooting, which also derives its objective of reflective/Penetrative scanning by switching the Light Path by means of a Light Factioning Prism of which the angle of rotation may be chosen optionally, but one such known structure is adapted only for the scanning of smaller objects, for example, Bust Photo or Photo Film, where a lower scanning resolution is permissible, but it can hardly do a barely acceptable job in scanning objects of a larger size.

In fact if only it is desirable to have at disposition a Precision Grade Scanner Device capable of scanning objects of a larger size, size B3, for example, and scanning objects of a larger size, size B3, for example, and which exhibits an excellent sweeping performance for example representing an optic resolution of 1 200 dpi or better, one will have to employ Charge Coupling Device (CCD) with a higher resolution and further, due to a longer Light Path required for the production of a clear image, a double reflector module capable of relative movement to each other at a speed ratio of 2 to 1, by then the Total Track of Light Path on which the production of image depends is amply extended to serve the purpose of a clear image presentation.

Regrettably, as aforementioned, all prior art scanner device composite reflective/penetrative scanning capability that are structurally devoid of a light hood, upper, overhung light source or backlight board, cannot be used in combination with aforementioned 2 to 1 speed ratio relative movement double reflector module. They therefore fail to yield a stable and high quality penetrative scanning image when operated to scan larger size objects, so improvement in this concern is needed.

SUMMARY OF THE INVENTION

The primary object the invention, therefore, is to provide a composite reflective/penetrative scanning apparatus which comprises a 2:1 speed ratio double movement reflector module quality scanning of larger size scripts with elevated scanning performances, and with the reflector lens being attached to the ambulatory reflector and as such immobilized from rotation or displacement, so that a more accurate positioning is made possible and resulting in better and more stable scanning performance.

The objectives of the present invention can/be accomplished by a reflective and Penetrative Scanning Apparatus which has a body, a first ambulatory reflection module, a second ambulatory reflection module, a lens assembly, an image shooting unit and an adjustment means. The body incorporates a Reflective Script Platform and a Penetrative Script Platform. The First Ambulatory Reflection Module is equipped with two Light Sources and two mirrors with which to produce two different Light Paths such that once the switching goes to the First Light Path, a light that is emitted from the Light Source will travel by way of the Reflective Script Platform to the Lens Assembly and the Image Shooting Unit, to execute Reflective Scanning operation and when the switching goes to the second Light Path, another light that is emitted from the Light Source will travel by way of the Penetrative Script Platform to the Lens Assembly and the Image Shooting Unit, to execute Penetrative Scanning Operation.

In one embodiment of the present invention, the invention further incorporates a tow pan which can be introduced into said access port.

BRIEF DESCRIPTIONS OF THE DRAWINGS

DESCRIPTION OF THE PREFERRED EMBODIMENTS

The present invention, consists essentially of a reflective script platform and a penetrative script platform on the body of a scanning apparatus which incorporates a first ambulatory reflection module and a second ambulatory reflection module both featuring a 2:1 speed ratio movement. The first ambulatory reflection module incorporates two light sources and two mirrors by which to produce two light paths different from each other. An adjustment means is further introduced to switch the positioning of both mirrors and an image shooting unit between both of said light paths, such that as the switching goes to a first light path, the "beam" that is emitted from the first light source will travel past the reflective script platform, directed to the mirrors and the image shooting unit so that scanning in a reflective mode is achieved. On switching to the second light path, however, the "beam" that is emitted from the light source will travel past the penetrative script platform, onto the mirrors and the image shooting unit, so that a penetrative mode of scanning processing is achieved instead. So that, with the incorporation of a double ambulatory reflection module featuring a 2:1 speed ratio movement, it will fit scanning processing of larger size scripts at elevated scanning performance, on the one hand, and with the mirrors attached to the ambulatory reflection module so that it remains immobilized therewith, on the other hand, it has made possible better and more stable scanning operations due to precise positioning.

Figure 1:
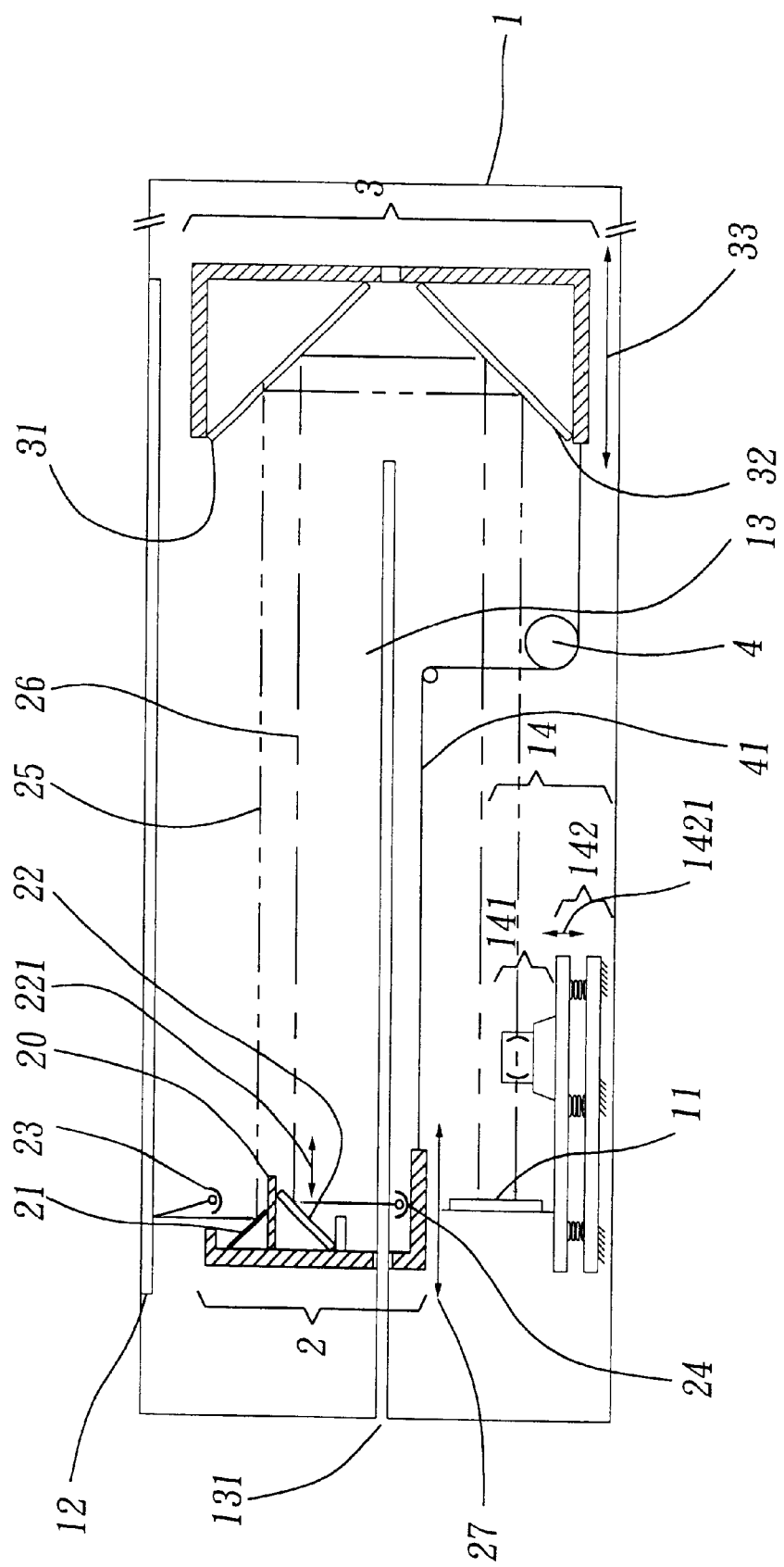
FIG. 1 is a cross-sectional view of the reflective/penetrative scanning apparatus in the first embodiment of the present invention.

Referring to FIG. 1, showing a first embodiment of a composite reflective/penetrative scanning apparatus, that is selectively executable to scan a a penetrative script in a penetrative scanning mode (not shown), the apparatus includes a body 1, a first ambulatory reflection module 2, a second ambulatory reflection module 3 and a drive 4.

The body 1 includes a reflective script platform 12, a penetrative script platform 13, an access port 131, an image shooting unit 11 (in the form of a Charge Coupling Device CCD, for example), and an image forming unit 14. The Image Forming Unit 14 further incorporates a Lens Set 141 and an adjustment means 142.

The access port 131 is in the form of a narrow oblong groove. The Reflective Script Platform 12 is seated upon a surface of the body 1 to bear the reflective script, the reflective script platform 12 may be added with an upper lid (not shown in the illustration) to fortify light shielding effect. The access port 131 is provided on the surface of one side of the body 1 by way of which a penetrative script may be fed into the body 1. The penetrative script platform 13 is mounted inside the body 1 and has one end associated with the access port 131, serving to accept and give support to the penetrative script delivered by way of said access port 131.

The second ambulatory reflection module incorporates a pair of symmetrically arranged third mirror 31 and fourth mirror 32, with the third mirror 31 capable of reflecting a "light beam" to the fourth mirror 32, and the fourth mirror 32, being symmetrical with lens set 141, will pass the incident "light beam" reflected to the lens set 141 where it is converged into an image onto the responsive image shooting unit 11 where the working "light" signal is converted into an electronic signal.

The first ambulatory reflection module 2 further incorporates: a first light source 23, a second light source 24, a first mirror 21, a second mirror 22 and a mirror fine adjustment means 20. The first light source 23 will supply the "light beam" to be emitted to the reflective script platform 12, while "light beam" supplied by the second light source 24 is to be emitted to the penetrative script platform 13.

In terms of its positioning and angular setting the first mirror 21 is arranged symmetrical with the reflective script platform 12 and with the third mirror 31, and the first mirror 21 will accept the "light beam" reflected from the reflective script platform 12, and reflect same to the third mirror 31. The second mirror 22 in terms of its positioning and angular setting is arranged symmetrical with the penetrative script platform 13 and with the third mirror 31, and the second mirror 22 will accept the "light beam" reflected from the penetrative script platform 13 and reflect same to the third mirror 31.

The adjustment means 14 is mounted integral with lens set 141 and image shooting unit 11, and serves to adjust the positioning of both lens set 141 and image shooting unit 11 vertically, that is, in a second adjustment direction 1421, to a point between a first position and a second position. The Drive 4 is coupled to the first and the second ambulatory reflection modules 2, 3 by means of a belt 41 and as such will bring both ambulatory reflection modules 2, 3 to linear movements relative to the body 1 at a 2:1 speed ratio (that is, in a first displacement direction 27 and in a second displacement direction 33 as shown in FIG. 1.). Since the drive 4 is of conventional art rather than a feature of the invention, the drive 4 will not be given any further description herein.

Structured and arranged accordingly, when and once the lens set 141 and image shooting unit 11 are both switched to a first position by the working of adjustment means 14, a first light path 25 is formed to run the scanning of reflective script. As shown in FIG. 1, the first light path 25 is prosecuted by the emission of a light beam released from the first light source 23, incident upon the reflective script platform 12, the "beam" reflected therefrom will then be refracted by the first mirror 21, the third mirror 31 and the fourth mirror 32, to the lens set 141 so that eventually an image takes form on the image shooting unit 11, this being a reflective mode of scanning.

When and as both the lens set 141 and the image shooting unit 11 are switched by the working of adjustment means 14 to a second position, a second light path 26 will formed to prosecute scanning of penetrative script. As shown in FIG. 1, the second light path 26 is prosecuted by the emission of a light beam released from the second light source 24, incident upon the penetrative script platform 13, the "beam" that penetrates the penetrative script on the penetrative script platform 13 will be refracted by the second mirror 22, the third mirror 31 and the fourth mirror 32, in a sequential order, to the lens set 141 so that eventually an image takes form on the image shooting unit 11, this representing a penetrative mode of scanning.

That a vertical displacement in the second adjustment direction 1421 does exist between the first light path 25 and the second light path 26 yields the rationale for the adjustment means 14 to effect adjustment of both lens set 141 and the image shooting unit 11 respecting their positioning in the vertical direction. The mirror fine adjustment unit 20 serves to adjust the Total Track Differential between the first light path 25 and the second light path 26, more specifically, to effect fine adjustment of the first mirror 21 or the second mirror 22 in a horizontal direction, that is, the first adjustment direction 221. Adjustment to be made with this mirror fine adjustment means 20 is reserved exclusively to the maker or qualified technicians for testing purposes respecting the scanning apparatus, end consumers do not have to, nor are they able to independently make use of the fine adjustment means 20.

Next will be described scanning operations of both reflective mode and penetrative mode.

To run a reflective mode of scanning operation, an opaque document, that is, a reflective script must be placed onto the reflective platform 12. Light from the first light source 23 will project a beam transmission pursuant to a first light path 25 whereby a series of reflections through the first mirror 21, the third mirror 31 and the fourth mirror 32 will pass onto the lens set 141 so that an image eventually takes form on the image shooting unit 11. Since the first ambulatory reflection module 2 and the second ambulatory reflection module 3 proceed with prorated speeds while maintaining an equal, lagging distance with respect to the first light path 25 on course, the image shooting unit 11 will read out the image till the document is scanned out in full, and the sweeping will then go back to the starting point all over again.

To run penetrative mode of scanning operation, a translucent document, that is, penetrative script must be introduced onto the penetrative script platform 13 by way of an access port 131, it being feasible for the penetrative script platform 13 to be one made of glass. The script will be penetrated by a second light source 24 turning active to run transmission of a light beam by way of a second light path 26, whereby a series of reflections will be effected in the sequential order of: the second mirror 22, the third mirror 31 and the fourth mirror 32, to the lens set 141, so that eventually an image takes form on the image shooting unit 11. Since the first ambulatory reflection module 2 and the second ambulatory reflection module 3 proceed with a prorated speed by maintaining an equal, lagging distance with respect to the second light path 26 on course, readout of image at the image shooting unit 11 will continue till the document is sweeped out in full, and the sweeping will then go back to the starting point all over again.

Figure 2:
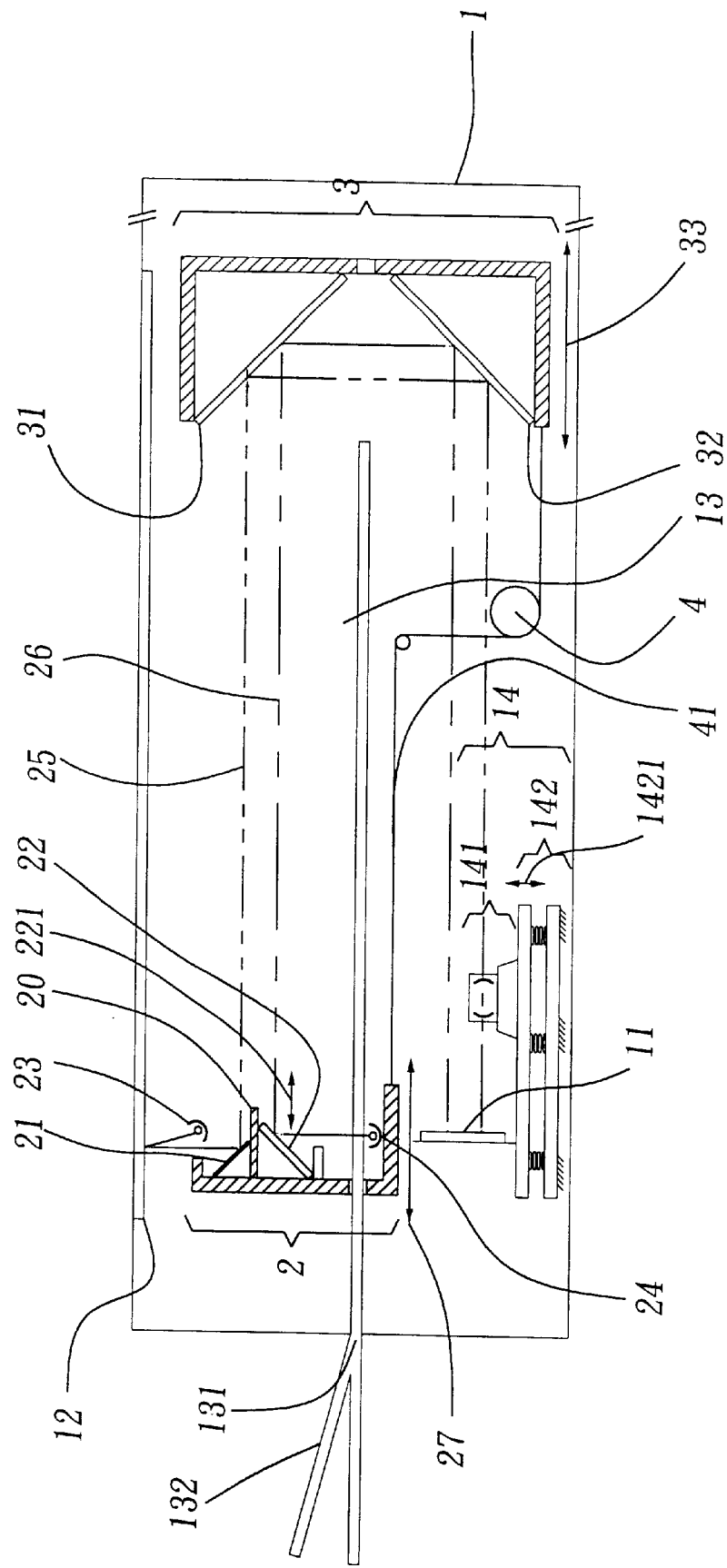
FIG. 2 is a cross-sectional view of the reflective/penetrative scanning apparatus in the second embodiment of the present invention.

Referring to FIG. 2, another preferred embodiment of the invention is illustrated using the same reference numbers for components identical to counterparts shown in FIG. 1. The embodiment of FIG. 2 differs from the preceding one in that it incorporates a tow pan 132 which is engageable into the access port 131, so that, in more specific terms, the tow pan 132 once laden with a penetrative script (not shown in the drawing), will be fit for feeding into the body 1 by way of said access port 131, to be established onto the penetrative script platform 13 which is left overt without and clear of any glass cover. Pursuant to an alternative, said tow pan 132 may be made separate from the body 1 and is to be introduced, into the body 1 manually be way of the same access port 131. Pursuant to still another alternative, the tow pan 132 may be driven by a motor device (not shown in the drawing) and automatically fed into or out of the same access port 131.

What has been disclosed thus far in the foregoing serves but as certain preferred embodiment of the invention, they by no means serve to limit the invention, but on the contrary, any change, alteration, modification made to the extent basing on whatever is claimed in the ensuing text will be considered not departing from the scope of the invention, but further prosecution of the invention.

What is claimed is:

1. A composite reflective/penetrative scanning apparatus, comprising:

a body which includes a reflective script platform serving to hold a reflective script in position, and an access port on one side thereof;

a penetrative script platform inside the body and coupled to said access port to accept and support a penetrative script fed via said access port;

a first ambulatory reflection module which includes:
a first light source that emits a first light beam to the reflective script platform;
a second light source that emits a second light beam to the penetrative script platform;
a first mirror arranged symmetrical with the reflective script platform, and which receives the light beam that is reflected from the reflective script platform; and
a second mirror arranged symmetrical with the penetrative script platform;

a second ambulatory reflection module which includes symmetrically arranged third and fourth mirrors, wherein the first mirror reflects the light beam that is reflected from the reflective script platform to the third mirror;

a drive assembly that drives the first and second ambulatory reflection modules into linear movement with respect to the body at a 2:1 speed ratio;

a lens assembly that receives a light reflected from the fourth mirror and converges same into an image;

an image shooting unit that receives the converged image from the lens assembly and converts same into electronic signals; and adjustment means, associated with the lens assembly and the image shooting unit, to adjust the vertical positioning of both the lens assembly and the image shooting unit between a first position and a second position;

wherein when set in the first position, both the lens assembly and the image shooting unit will accept a light beam that is emitted from the first light source, and which comes by way of the reflective script platform, the first mirror, the third mirror and fourth mirror in that sequential order, in a reflective mode of scanning; and wherein when the lens assembly and the image shooting unit are set in the second position, the lens assembly and the image shooting unit will accept a light beam as emitted from the second light source, coming by way of the penetrative script platform, the second mirror, the third mirror and the fourth mirror, in that sequential order, in a penetrative mode of scanning.

2. The apparatus of claim 1, further comprising a tow pan engageable with said access port, and in which said tow pan is introduced into the penetrative script platform in the body by way of said access port.

3. The apparatus of claim 2, wherein said tow pan is separate from the body.

4. The apparatus of claim 2, wherein said tow pan is normally introduced into the body by way of said access port.

5. The apparatus of claim 2, wherein said tow pan is transmitted by a motor assembly for automatic feeding into or conversely, out of said access port.

6. The apparatus of claim 1, wherein said access port is a narrow oblong groove.

7. The apparatus of claim 1, wherein said image shooting unit is a charge coupling device (CCD).

8. The apparatus of claim 1, wherein said first ambulatory reflection module further incorporates a mirror fine adjustment means which serves to effect fine adjustment of the first mirror or the second mirror in a horizontal direction.

9. A composite reflective/penetrative scanning apparatus, comprising:
   a body which includes a reflective script platform serving to hold a reflective script in position, and an access port on of one side thereof;
   a penetrative script platform inside the body and coupled to said access port to accept and support a penetrative script fed via said access port;
   a first ambulatory reflection module and a second ambulatory reflection module;
   a drive assembly that drives the first and second ambulatory reflection modules into linear movement at a 2:1 speed ratio relative to the body;
   a lens set that receives a light beam reflected from the second ambulatory reflection module and converges same into an image;
   an image shooting unit that receives the converged image from said lens set and converts same into electronic signals;
   adjustment means that is coupled to said lens set and image shooting unit to switch, through adjustment processing, said lens set and image shooting unit between a first light path and a second light path;
   wherein said first ambulatory reflection module further incorporates:
      a first light source that provides a light beam that is emitted to the reflective script platform;
      a second light source that provides a light beam that is emitted to the penetrative script platform;
      a first mirror that receives a light that is reflected from the reflection script platform; and
      a second mirror that receives a light that is reflected from the penetrative script platform;
   wherein once the lens set and the image shooting unit are both aligned with the first light path, the lens set and the image shooting unit will both receive the light emitted from the first light source via the reflective script platform, the first mirror and the second ambulatory reflection module, in a reflective mode of scanning; and
   when the lens set and the image shooting unit are both aligned with the second light path, the lens set and the image shooting unit will both receive the light emitted from the second light source via the penetrative script platform, the second mirror, and the second ambulatory reflection module, in a penetrative mode of scanning.

10. The apparatus of claim 9, further comprising a tow pan engageable into said access port and introduced by way of said access port onto the penetrative script platform in the body.

11. The apparatus of claim 9, wherein said tow pan is separate from the body.

12. The apparatus of claim 9, wherein said tow pan is introduced manually by way of the access port into the body.

* * * * *